(12) United States Patent
Hu (10) Patent No.: US 10,157,065 B2
(45) Date of Patent: Dec. 18, 2018

(54) DEVICE PROGRAMMING SYSTEM WITH WHOLE CHIP READ AND METHOD OF OPERATION THEREOF

(71) Applicant: Data I/O Corporation, Redmond, WA (US)

(72) Inventor: ShengHua Hu, Shanghai (CN)

(73) Assignee: Data I/O Corporation, Redmond, WA (US)

( * ) Notice: Subject to any disclaimer, the term of this patent is extended or adjusted under 35 U.S.C. 154(b) by 850 days.

(21) Appl. No.: 14/040,063

(22) Filed: Sep. 27, 2013

(65) Prior Publication Data

US 2015/0095519 A1    Apr. 2, 2015

(51) Int. Cl.
 *G06F 9/44*    (2018.01)
 *G06F 3/06*    (2006.01)
 *G06F 9/4401*    (2018.01)

(52) U.S. Cl.
 CPC .......... *G06F 9/4411* (2013.01); *G06F 3/0608* (2013.01)

(58) Field of Classification Search
 CPC ....... G06F 9/4411; G06F 3/0608; G11B 5/86; G11B 7/28
 See application file for complete search history.

(56) References Cited

U.S. PATENT DOCUMENTS

| | | | | |
|---|---|---|---|---|
| 8,032,556 | B1* | 10/2011 | Cook | G06F 17/30899 707/732 |
| 8,307,151 | B1* | 11/2012 | Caraccio | G06F 12/0223 711/103 |
| 2002/0026258 | A1* | 2/2002 | Suzuki | B65G 57/04 700/112 |
| 2007/0220220 | A1* | 9/2007 | Ziv | G06F 3/0605 711/159 |
| 2008/0005393 | A1* | 1/2008 | Wang | G11B 5/86 710/33 |
| 2008/0016302 | A1 | 1/2008 | Wang et al. | |
| 2008/0250077 | A1* | 10/2008 | Fahey | G11B 20/1803 |
| 2011/0119428 | A1 | 5/2011 | Chang et al. | |
| 2011/0199823 | A1 | 8/2011 | Bar-or et al. | |
| 2013/0205068 | A1* | 8/2013 | Kettner | G06F 12/0246 711/103 |
| 2013/0205110 | A1* | 8/2013 | Kettner | H03M 7/6064 711/170 |

OTHER PUBLICATIONS

C-Ming Technology Co. Ltd, "UPM-100: USB Interface eMMC Programmer Introduction/Installation & Operation Guide", Jul. 19, 2013, http://www.cm-tech.com.tw/comm/upfile/p_140927_02030.pdf.*

(Continued)

*Primary Examiner* — Glenn A. Auve
*Assistant Examiner* — Phong H Dang
(74) *Attorney, Agent, or Firm* — Wong & Rees LLP (57) ABSTRACT

A system and method of operation of a device programming system includes: a socket adapter having a source socket and a destination socket for reading a configuration information from a master device; a partition table calculated from the master device; and a master data file formed from the partition table and the configuration information, the master data file for configuring a programmable device.

20 Claims, 4 Drawing Sheets

(56) References Cited

OTHER PUBLICATIONS

C-Ming Technology Co. Ltd, "UPM—USB Interface eMMC Programmer Introduction/User's Guide", 2013, 14 pages, Published in: Taiwan, ROC, http://www.cm-tech.com.tw/comm/upfile/p_120409_03740.pdf.

International Microsystems Incorporated, "M6650 SD Memory Card Duplicator", 2008, 2 pages, Published in: Milpitas, California, http://www.imi-test.com/fckfiles/M6650.pdf.

* cited by examiner

DEVICE PROGRAMMING SYSTEM WITH WHOLE CHIP READ AND METHOD OF OPERATION THEREOF

TECHNICAL FIELD

The present invention relates generally to automated systems, and more particularly to a device programming system with whole chip read for programmable devices.

BACKGROUND ART

Certain operations of electronic circuit board assembly are performed away from the main production assembly lines. While various feeder machines and robotic handling systems populate electronic circuit boards with integrated circuits, the operations related to processing integrated circuits, such as programming, testing, calibration, and measurement are generally performed in separate areas on separate equipment rather than being integrated into the main production assembly lines.

For example, in the programming of programmable devices such as Flash memories, electrically erasable programmable read only memories (EEPROM), programmable logic devices (PLDs), field programmable gate arrays (FPGAs), and microcontrollers incorporating non-volatile memory elements separate programming equipment is used which is often located in a separate area from the circuit board assembly lines. Accessing the programmed devices requires additional transportation and delivery systems.

There is a need for a system and system sub-assemblies that enable programming of multiple programmable devices at a manufacturing environment. For example, earlier systems use tape-on-reel lines that rely on carrier tapes with micro devices such as programmable devices placed at uniform distances on the tape. The programmable devices on the tape are protected by a cover tape that is removed prior to handling the micro device and can be delivered to a manufacturing system.

Thus, a need still remains for a system and system sub-assemblies that enable programming of multiple programmable devices within a manufacturing line. In view of the lack of operational efficiency in the programming and packaging of programmable devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a tray stacker system including: receiving a master device in a socket adapter having a source socket and a destination socket; reading a configuration information from the master device; forming a master data file using the configuration information and a partition table from the master device; and configuring a programmable device with the master data file.

In addition, the present invention provides a tray stacker system including: a socket adapter having a source socket and a destination socket for reading a configuration information from a master device; a partition table calculated from the master device; and a master data file formed from the partition table and the configuration information, the master data file for configuring a programmable device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention, and it is to be understood that other embodiments would be evident based on the present disclosure and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations, and process steps are not disclosed in detail. Likewise, the drawings showing embodiments of the invention are semi-diagrammatic and not to scale and, particularly, some of the dimensions are for the clarity of presentation and are shown exaggerated in the drawing FIGs. In addition, where multiple embodiments are disclosed and described having some features in common, for clarity and ease of illustration, description, and comprehension thereof, similar and like features one to another will ordinarily be described with like reference numerals.

Figure 1:
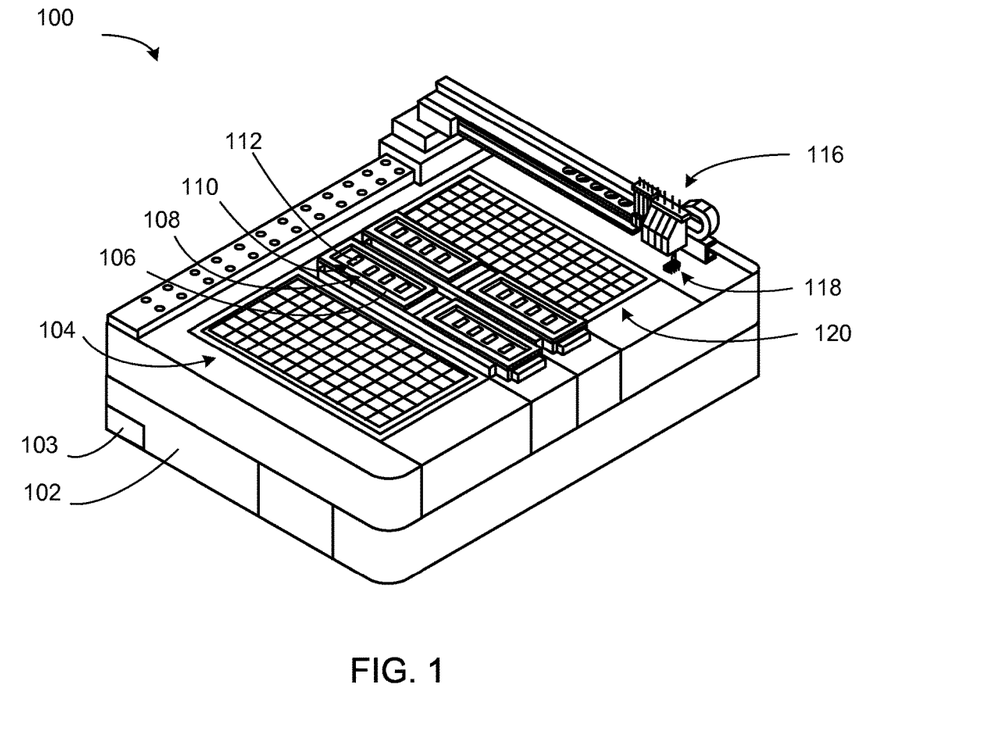
FIG. 1 is an isometric view of a device programming system in an embodiment of the present invention.

Referring now to FIG. 1, therein is shown an isometric view of a device programming system 100 in an embodiment of the present invention. The device programming system 100 includes a controller 102, an input device receptacle 104, socket adapters 106, destination sockets 108, source sockets 110, a device placement unit 116, programmable devices 118, and an output device receptacle 120

The device programming system 100 is a device for configuring programmable devices 118. The device programming system 100 can read a whole chip at a time and then configure the programmable devices 118. Configuring is defined as writing control and data information to the programmable devices 118. Configuring the programmable devices 118 can store memory structure and user data on the programmable devices 118. Configuring can include forming one-time structures such as partitions on the programmable devices 118.

The device programming system 100 can include the controller 102. The controller 102 is a computing unit for controlling the device programming system 100. The controller 102 can include a central processing unit (not shown), a local storage unit 103, a communication interface (not shown), and a software (not shown).

The local storage unit 103 is a device for storing and retrieving information. For example, the local storage unit 103 of the device programming system 100 can be a disk drive, a solid-state memory, an optical storage device, or a combination thereof. The software is control information for executing on the control unit. The software can be used to control the functionality of the device programming system 100.

The device programming system 100 can include the input device receptacle 104 and the output device receptacle 120. The input device receptacle 104 is a source of the programmable devices 118. For example, the input device receptacle 104 can be a tray that conforms to the Joint Electron Device Engineering Council (JEDEC) standards. The input device receptacle 104 can be used for holding unprogrammed devices.

The output device receptacle 120 is a destination for programmable devices 118 that have been processed. For example, the output device receptacle 120 can be an empty JEDEC tray for holding finished devices.

The device programming system 100 can include the socket adapters 106 having the source sockets 110 and the destination sockets 108. The socket adapters 106 are mechanisms for holding and managing sockets. The sockets are mechanisms for holding and interfacing with the programmable devices 118.

The socket adapters 106 are modular and can be removed from the device programming system 100 to accommodate different socket configurations. For example, the socket adapters 106 can include a latch mechanism (not shown) for attaching to the device programming system 100.

The source sockets 110 and the destination sockets 108 can be used to read or write the programmable devices 118. In general, the source sockets 110 can be used to read one of the programmable devices 118 that has already been programmed. The destination sockets 108 can be used to write new information to one of the programmable devices 118.

The device programming system 100 can include the device placement unit 116. The device placement unit 116 is a mechanism for positioning a programmable device in one of the source sockets 110 or one of the destination sockets 108.

The device placement unit 116 can be implemented in a variety of ways. For example, the device placement unit 116 can be a robotic arm, a pick and place mechanism, or a combination thereof. Although the device placement unit 116 is described as a rail-based positioning system, it is understood that any system capable of positioning one of the programmable devices 118 in the source sockets 110 or the destination sockets 108 can be used.

The device placement unit 116 can position a master device 112 into one of the source sockets 110 on one of the socket adapters 106. The device programming system 100 can receive the master device 112 in the source sockets 110, read the master device 112, and store the information from the master device 112 in the local storage unit 103. The device programming system 100 can then remove the master device 112 from the source sockets 110.

The device placement unit 116 can retrieve one or more of the programmable devices 118 that are blank from the input device receptacle 104 and transport the programmable devices 118 to the source sockets 110 and the destination sockets 108 of the socket adapters 106.

Once the programmable devices 118 are engaged and secured by the socket adapters 106, programming can begin. The device programming system 100 can program the local copy of the information from the master device 112 into the programmable devices 118 in one of the source sockets 110 and the destination sockets 108.

Once programming is complete, the device placement unit 116 then transports the programmable devices 118 that have been programmed to the output device receptacle 120. The device placement unit 116 can transports any of the programmable devices 118 that have errors to a reject bin (not shown).

Figure 2:
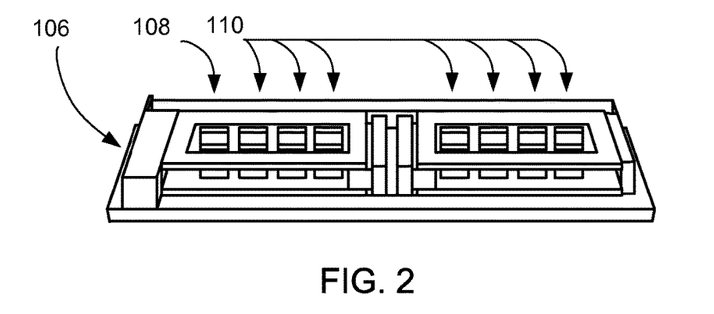
FIG. 2 is an isometric view of one of the socket adapters.

Referring now to FIG. 2, therein is shown an isometric view of one of the socket adapters 106. The socket adapters 106 can include one or more sockets for retaining the programmable devices 118 of FIG. 1. The socket adapters 106 can include the source sockets 110 and the destination sockets 108.

The socket adapters 106 can have a variety of configuration. For example, the socket adapters 106 can include one of the source sockets 110 and three of the destination sockets 108. In another example, one of the socket adapters 106 can include four destination sockets 108 for configuring the programmable devices 118. Although the socket adapters 106 are shown with four sockets, it is understood that the socket adapters 106 any number and combination of the source sockets 110 and the destination sockets 108.

The source sockets 110 are for reading and writing the programmable devices 118. The source sockets 110 can be used to read from the master device 112, which can be pre-programmed device. Although the source sockets 110 are used to read information from the master device 112 of FIG. 1, the source sockets 110 can also be used to write information to the programmable devices 118 that are unprogrammed. The destination sockets 108 are only used to configure the programmable devices 118 that are blank or unprogrammed.

Figure 3:
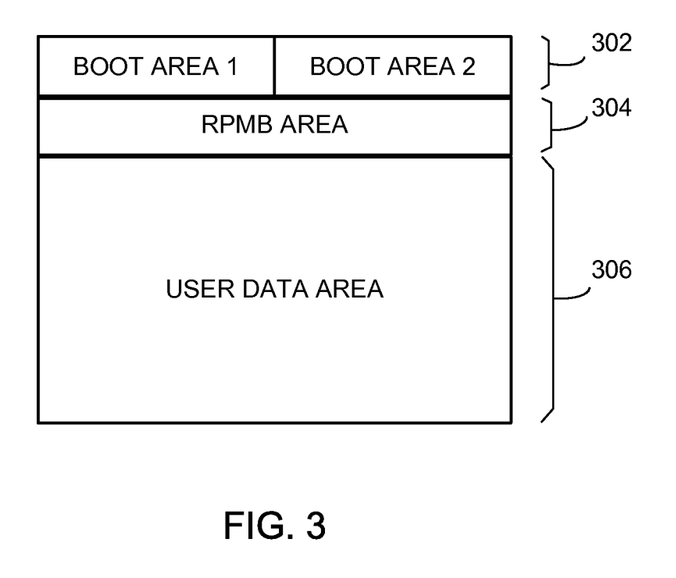
FIG. 3 is a first exemplary memory configuration of the master device.

Referring now to FIG. 3, therein is shown a first exemplary memory configuration of the master device 112 of FIG. 1. The master device 112 can include boot partitions 302, replay protected memory block partitions 304, and a user data area 306, or a combination thereof.

The master device 112, such as an embedded multimedia card (eMMC) flash memory device, can have different memory configurations according to the targeted purpose of the device. The master device 112 can store different types of information.

The master device 112 can include the boot partitions 302. The boot partitions 302 are dedicated memory areas of the master device 112 used to hold information related to booting the master device 112. The master device 112 can include one or more of the boot partitions 302.

The master device 112 can include the replay protected memory block partitions 304. The replay protected memory block partitions 304 are section of memory that can be configured to have enhanced security attributes. For example, the replay protected memory block partitions 304 can be configured to be read only.

The replay protected memory block partitions 304 are for managing data in an authenticated and replay-protected manner. The replay protected memory block partition 304 can include an authentication key (not shown) for protecting access to the replay protected memory block partitions 304.

The master device 112 can include the user data area 306. The user data area 306 is a portion of memory for the master device 112 for storing user information. The user data area 306 can be used to store user-specific data.

Figure 4:
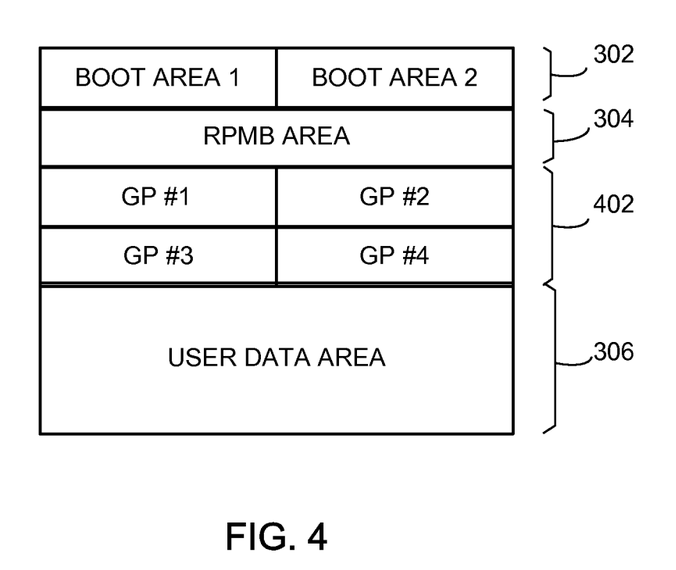
FIG. 4 is a second exemplary memory configuration of the master device.

Referring now to FIG. 4, therein is shown a second exemplary memory configuration of the master device 112 of FIG. 1. The master device 112 can include the boot partitions 302, the replay protected memory block partitions 304, general purpose area partitions 402, the user data area 306, or a combination thereof.

The memory configuration of the master device 112 is shown after partitioning the user data area 306. The master device 112 can use the different partitions to store different types of information.

The master device 112 can include the general purpose area partitions 402 formed in the user data area 306. The general purpose area partitions 402 are used to store general purpose data.

The general purpose area partitions 402 can have a variety of configurations. For example, the master device 112 can include up to four of the general purpose area partitions 402.

Figure 5:
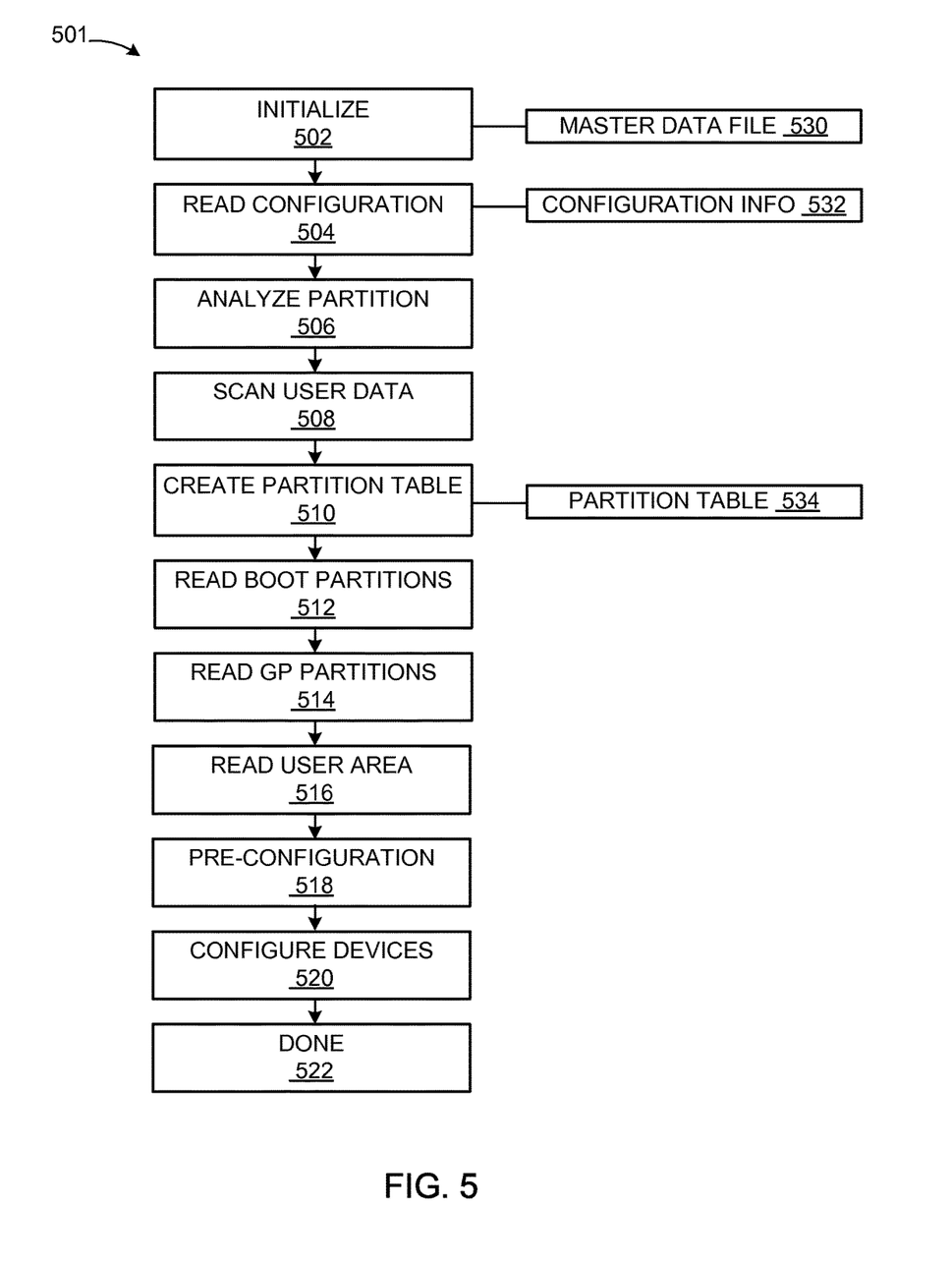
FIG. 5 is an exemplary control flow chart of a whole chip read process.

Referring now to FIG. 5, therein is shown an exemplary control flow of a whole chip read process 501. The control flow can include the steps for reading the master device 112, creating a master data file 530, and writing the master data file 530 to the programmable devices 118 of FIG. 1 in the source sockets 110 of FIG. 1 and the destination sockets 108 of FIG. 1.

The whole chip read process 501 can include a initialize step 502, a read configuration information step 504, an analyze partitions step 506, a scan user data step 508, a create partition table step 510, a read boot partitions step 512, a read general purpose partitions step 514, a read user area step 516, a pre-configuration step 518, a configure devices step 520, and a done step 522.

The control flow of the whole chip read process 501 begins with the initialize step 502 and the control flow passes to the next higher step number after the execution of each step. The whole chip read process 501 terminates with the done step 522.

In the initialize step 502, the device programming system 100 of FIG. 1 can receive the master device 112 in the socket adapter 106 of FIG. 1 having one of the source sockets 110 and at least one of the destination sockets 108. For example, the master device 112 can be placed in the source sockets 110 using the device placement unit 116 of FIG. 1. In another example, the master device 112 can be inserted manually. In yet another example, the master device 112 can be omitted and the master data file 530 can be loaded directly into the local storage unit 103 of FIG. 1 and then used for configuring the programmable devices 118.

The master device 112 is a pre-programmed device to be copied to the programmable devices 118. The master device 112 can be a variety of devices. For example, the master device 112 can be an eMMC flash memory device, a read only memory (ROM), a field programmable gate array, a NOT AND (NAND) flash memory, a NOT OR (NOR) flash memory, or a combination thereof.

The programmable devices 118 can be the same type of device as the master device 112. The programmable devices 118 can be a different type of device than the master device 112, such as a larger memory device.

In the read configuration information step 504, the device programming system 100 can read the configuration information 532 from the master device 112. The configuration information 532 is control information describing the structure of the master device 112. The configuration information 532 can include the extended chip-specific data (eCSD) register information of an eMMC flash memory device, partition tables, memory layouts, register information, physical device information, or a combination thereof.

The configuration information 532 can include information for data size, data partitions, booting information, operational information, or a combination thereof. In an illustrative example, the configuration information 532 can include the eCSD register information such as total memory size, boot partition information, general purpose partition information, replay protected memory block information, the user data area information, or a combination thereof.

In the analyze partitions step 506, the device programming system 100 can process the configuration information 532 to determine which information should be recorded in the master data file 530. The master data file 530 is a locally stored data file having the information describing the master device 112. The master data file 530 can include boot information, partition information, security information, user data, register information, or a combination thereof.

For example, the device programming system 100 can determine the location, type, number, and size of the general purpose area partitions 402 of FIG. 4, the boot partitions 302 of FIG. 3, and the user data area 306 of FIG. 3 of an eMMC flash memory device by checking the extended CSD register information. After the device programming system 100 has determined the location, type, number, and size of the partitions on the master device 112, the device programming system 100 can initialize the master data file 530 for the master device 112.

In the scan user data step 508, the device programming system 100 can use the configuration and partition information to scan the user data area 306 to determine how much data is in use and how much data area is unused. By determined the amount of data in actual use in the user data area 306, the master data file 530 can be configured to only contain the data in use and not allocate space for the remaining portion of the user data area 306 of the master device 112. Limiting the master data file 530 to actively used data can reduce the size of the master data file 530 and thereby reduce the amount of time required to store and write the master data file to the programmable devices 118.

It has been discovered that scanning the user data area 306 to determine the amount of memory in use can reduce the amount of time for programming the programmable devices. By reducing the master data file 530 by only storing the memory that is in use, performance is increased by reducing the total volume of data stored and retrieved from the master data file 530.

In the create partition table step 510, the device programming system 100 can create a partition table 534 for the master data file 530 of the master device 112. The partition table 534 is a data structure showing the type, location, number, and size of the partitions on the master device 112 that are represented within the master data file 530.

The partition table 534 can include information about the boot partitions 302, the general purpose area partitions 402, the user data area 306, the replay protected memory block partitions 304 of FIG. 3, or a combination thereof. The partition table 534 can be created using the partition information in the configuration information 532, such as the extended CSD register information.

In an illustrative example, the partition table 534 can include information about enhanced data areas, physical address starting point, physical address size, or a combination thereof. The partition table 534 can be stored in the local storage unit 103 of the controller 102 of FIG. 1.

The partition table 534 can be modified to accommodate differences between the memory size of the master device 112 and the programmable devices 118. For example, if the master device 112 has a memory size of 2 gigabytes (GB) and the programmable devices 118 have a memory size of 4 GB, then the partition table 534 can be configured to double the size of each of the partitions.

It has been discovered that creating the partition table 534 for the master device 112 increases speed of operation of the device programming system 100. The partition table 534 allows the programmable devices 118 to be prepared in advance for being configured with the master data file 530 for duplicating the master device 112.

In the read boot partitions step 512, the device programming system 100 can determine the number and size of the boot partitions 302 based on the configuration information, such as the eCSD register information, and copy the information within the boot partitions 302 to the master data file 530. The master device 112 can have a variety of configurations for the boot partitions 302. For example, the master device 112, such as an eMMC flash memory device, can have two of the boot partitions 302.

In the read general purpose partitions step 514, the device programming system 100 can check the configuration information 532, such as the eCSD register information, to determine if the master device 112 includes any of the general purpose area partitions 402. If the configuration information 532, indicates that the master device 112 includes general purpose area partitions 402, then the data in each of the general purpose area partitions 402 can be read from the master device 112 and stored in the master data file 530.

The master device 112 can include a variety of configurations for the general purpose area partitions 402. For example, the master device 112 can include between one and four of the general purpose area partitions 402. Each of the general purpose area partitions 402 can have a separate address space.

It has been discovered that writing the information from the general purpose area partitions 402 to the master data file 530 can increase processing speed for configuring the programmable devices 118. Consolidating the information from the general purpose area partitions 402 allows multiple write operations to be performed without accessing the master device 112.

In the read user area step 516, the device programming system 100 can read the data in the user data area 306 and store the data from the master device 112 in the master data file 530. The data in the user data area 306 can be processed in a variety of ways. For example, the device programming system 100 can read the portions of the user data area 306 that contain data and only write that data to the master data file 530. In an alternative example, the device programming system 100 can write the data of the user data area 306 including the unused portions to the master data file 530.

It has been discovered that storing the modified data from the user data area 306 from the master device 112 increases throughput and reduces manufacturing errors. By only storing the modified data from the user data area 306 in the programmable devices 118 in the source sockets 110 and the destination sockets 108, the total volume of data is reduced resulting in decreased write time and fewer write errors.

It has been discovered that storing the configuration of the master device 112 in the master data file 530 increases manufacturing flexibility. Forming the master data file 530 allows changes in the configuration of the programmable devices 118 without modifying the master device 112.

In the pre-configuration step 518, the device programming system 100 can prepare for configuring the programmable devices 118 with the master data file 530 by switching to a program mode for configuring the programmable devices 118. Preparing for configuring the programmable devices 118 can include operations such as replacing the master device 112 with one of the programmable devices 118 that is unconfigured, loading the programmable devices 118 into the source sockets 110 and the destination sockets 108, providing the master data file 530, decompressing the master data file 530, or a combination thereof.

The programmable devices 118 can be configured in a variety of ways. For example, the device programming system 100 can remove the master device 112 from one of the source sockets 110 and place one of the programmable devices 118 in one of the source sockets 110 on one of the socket adapters 106 of FIG. 1 and then write the control and user data from the master data file 530 into each of the programmable devices 118 in the source sockets 110 and the destination sockets 108. Each of the source sockets 110 can be used to both read data from the master device 112 for forming the master data file 530 and for configuring one of the programmable devices 118 with the control and user data from the master data file 530.

In another example, the device programming system 100 can leave the master device 112 in one of the source sockets 110 and configure the programmable devices 118 in the destination sockets 108 with the control and user data from the master data file 530. The socket adapters 106 can be configured to write the master data file 530 to all of the source sockets 110 and the destination sockets 108 to increase the overall throughput of the device programming system 100.

Although the device programming system 100 has been described in terms of one of the socket adapters 106 having a mix of the source sockets 110 and the destination sockets 108, it is understood that other configuration are possible. The device programming system 100 can include a plurality of the socket adapters 106 having only the destination sockets 108 for configuring a larger number of the programmable devices 118 at one time.

It has been discovered that using the source socket 110 for both reading the master device 112 and writing to the programmable devices 118 reduces processing time and increases functionality. Using the source socket 110 for reading and writing increases the number of the programmable devices 118 that can be configured in each cycle and increases the production rate.

It has been discovered that compressing the master data file 530 on the local storage unit 103 reduces processing time and storage space. Compressing the master data file 530 reduces the amount of data transferred from the local storage unit 103. The programmable devices 118 are configured faster by decompressing the master data file 530 having a reduced data size and using the master data file 530 to the programmable devices 118.

It has been discovered that using the source socket 110 for both reading the master device 112 and writing to the programmable devices 118 increases manufacturing throughput. Because the source socket 110 is for reading and writing, there is no need to reserve spare sockets for the master device 112 and less time is needed to configure the programmable devices 118.

It has been discovered that configuring one of the socket adapters 106 having one of the source sockets 110 and three of the destination sockets 108 reduces processing time by allowing simultaneous configuration of the programmable devices 118 in the destination sockets 108. The master data file 530 is extracted from the master device 112 and stored in the local storage unit 103. The master data file 530 is then directly transferred from the local storage unit 103 to each of the programmable devices 118 in the destination sockets 108 simultaneously to reduce the processing time by configuring multiple devices at the same time.

In the configure devices step 520, the device programming system 100 can configured the programmable devices 118 in the socket adapters 106 with the master data file 530. Configuring the programmable devices 118 can include initializing and partitioning the programmable devices 118 by writing the partition table 534 to the programmable devices 118, initializing and writing boot information to the boot partitions 302, initializing and writing the general purpose area partitions 402, and initializing and writing the user data area 306 to the programmable devices 118.

After the programmable devices 118 have been configured with the master data file 530, the programmable devices 118 can be removed from the socket adapters 106 using the device placement unit 116. The device placement unit 116 can move the programmable devices 118 from the source sockets 110 and the destination sockets 108 and into the output device receptacle 120.

In another example, the device programming system 100 can replace the programmable devices 118 that have been configured with the programmable devices 118 from the input device receptacle 104 that are unconfigured. The device programming system 100 can continue the cycle of configuring and replacing the programmable devices 118 until the supply of the programmable devices 118 is exhausted.

It has been discovered that configuring the programmable devices 118 with the master data file 530 increase production rates and increases functionality. Consolidating the information from the boot partitions 302, the general purpose area partitions 402, and the user data area 306 into the master data file 530 enables the configuration of multiples of the programmable devices 118 without contention for access to the master device 112.

It has been discovered that using the source socket 110 for both reading the master device 112 and writing to the programmable devices 118 reduces processing time and increases functionality. Using the source socket 110 for reading and writing increases the number of the programmable devices 118 that can be configured in each cycle and increases the production rate by reducing the configuration time.

In the done step 522, the device programming system 100 can transfer the programmable devices 118 that have been configured to the output device receptacle 120. The source sockets 110 and the destination sockets 108 can then be repopulated with the programmable devices 118 from the input device receptacle 104 for further configuration with the master data file 530.

It has been discovered that forming the master data file 530 from the master device 112 reduces manufacturing complexity. The master data file 530 can be modified to configure the programmable devices 118 having different storage capacities than the master device 112.

It has been discovered that storing the configuration of the master device 112 in the master data file 530 increases manufacturing throughput. Forming the master data file 530 eliminates the time required to manually prepare the master data file 530 using discrete software tools and adapts to changes in the configuration of the master device 112.

Figure 6:
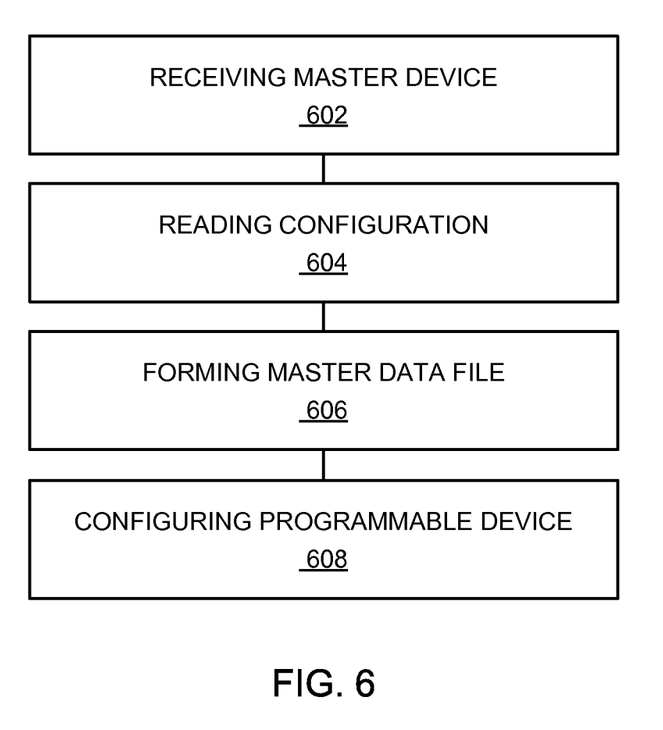
FIG. 6 is a flow chart of a method of operation of the device programming system in a further embodiment of the present invention.

Referring now to FIG. 6, therein is shown a flow chart of a method 600 of operation of the device programming system 100 of FIG. 1 in a further embodiment of the present invention. The method 600 includes: receiving a master device in a socket adapter having a source socket and a destination socket in a block 602; reading a configuration information from the master device in a block 604; forming a master data file using the configuration information and a partition table from the master device in a block 606; and configuring a programmable device with the master data file in a block 608.

It has been discovered that the device programming system 100 of the present invention furnishes important and heretofore unknown and unavailable solutions, capabilities, and functional aspects for quickly setting up in-line programming of non-volatile memory devices.

The resulting processes and configurations are straightforward, cost-effective, uncomplicated, highly versatile and effective, can be surprisingly and unobviously implemented by adapting known technologies, and are thus readily suited for efficiently and economically manufacturing semiconductor packages fully compatible with conventional manufacturing processes and technologies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto set forth herein or shown in the accompanying drawings are to be interpreted in an illustrative and non-limiting sense.

What is claimed is:

1. A method of operation of a device programming system comprising:
   positioning a master device in a source socket of a socket adapter using a device placement unit, the socket adapter having the source socket and one or more destination sockets;
   positioning one or more programmable devices in the destination sockets of the socket adapter using the device placement unit;
   reading configuration information and actively used data from a user data memory area from the master device, the configuration information including a partition table of the master device, the partition table describing partition information of the master device including the user data memory area, a general purpose partition, and a replay protected memory block partition;
   forming a master data file using the configuration information and the partition table from the master device, the master data file having a reduced user data memory area containing only the actively used data, the master data file configured not to allocate file space for unused portions of the user data memory area, resulting in a size of the reduced user data memory area being smaller than a size of the user data memory area of the master device;
   modifying partition sizes in the partition information in the partition table of the master data file based on a memory size of the programmable devices, the partition sizes having a size different from partition sizes of the master device;

replacing the master device with another one of the programmable devices in the source socket with the device placement unit;

reconfiguring the source socket as one of the destination sockets;

configuring the partitions of the programmable devices in the destination sockets of the socket adapter simultaneously using the master data file, each of the programmable devices having a: user data memory area, general purpose partition, and replay protected memory block partition; and writing the master data file to the programmable devices including writing the actively used data from the reduced user data memory area of the master data file into the user data memory area of the programmable devices.

2. The method as claimed in claim 1 wherein forming the master data file includes:

compressing the master data file to a storage unit including compressing the reduced user data memory area having only the actively used data from the master device; and prior to writing the master data file to the programmable devices, decompressing the master data file from the storage unit including decompressing the reduced user data memory area.

3. The method as claimed in claim 1 wherein reading the configuration information includes reading an extended chip-specific data register information of an embedded multimedia card flash memory device.

4. The method as claimed in claim 1 wherein configuring the programmable devices includes replacing the master device with one of the programmable devices in the source socket.

5. The method as claimed in claim 1 wherein configuring the programmable devices includes writing boot information to a boot partition of the programmable devices in the destination sockets.

6. A method of operation of a device programming system comprising:

positioning a master device in a source socket of a socket adapter using a device placement unit, the socket adapter having the source socket and one or more destination sockets;

positioning one or more programmable devices in the destination sockets of the socket adapter using the device placement unit;

reading configuration information and actively used data from a user data memory area from the master device, the configuration information including a partition table of the master device, the partition table describing partition information of the master device including the user data memory area, a general purpose partition, and a replay protected memory block partition;

calculating the partition table of the master device using the configuration information;

forming a master data file using the partition table and the configuration information, the master data file having a reduced user data memory area containing only actively used data, the master data file configured not to allocate file space for unused portions of the user data memory area, resulting in a size of the reduced user data memory area being smaller than a size of the user data memory area of the master device;

modifying partition sizes in the partition information in the partition table of the master data file based on a memory size of the programmable devices, the partition sizes having a size different from partition sizes of the master device;

replacing the master device with another one of the programmable devices in the source socket with the device placement unit;

reconfiguring the source socket as one of the destination sockets;

configuring the partitions of the programmable devices the destination sockets simultaneously using the master data file each of the programmable devices having a: user data memory area, general purpose partition, and replay protected memory block partition; and writing the master data file to the programmable devices including writing the actively used data from the reduced user data memory area of the master data file into the user data memory area of the programmable devices.

7. The method as claimed in claim 6 wherein modifying the partition information of the partition table includes calculating the partition table for an embedded multimedia card (eMMC) flash memory device having a boot partition, the general purpose area partition, and the user data memory area.

8. The method as claimed in claim 6 wherein modifying the partition information of the partition table includes calculating the partition table using the extended chip-specific data register information of an embedded multimedia card (eMMC) flash memory device.

9. The method as claimed in claim 6 wherein forming the master data file includes writing a boot partition, the general purpose area partition, and the user data memory area to the master data file.

10. The method as claimed in claim 6 wherein positioning the master device includes removing one of the programmable devices from the source socket with the device placement unit.

11. A device programming system comprising:

a socket adapter having a source socket and one or more destination sockets, the socket adapter configured to read configuration information and actively used data from a user data memory area from a master device;

a device placement unit configured to position the master device in the source socket of the socket adapter and one or more programmable devices in the destination sockets of the socket adapter, and the source socket configured to be used as one of the destination sockets;

a partition table describing partitions of the programmable devices including the user data memory area, a general purpose partition, and a replay protected memory block partition, the partitions having partition sizes different from the master device, and the partitions based on a memory size of the programmable devices; and a master data file having the partition table and the configuration information, the master data file having a reduced user data memory area containing only the actively used data, the master data file configured not to allocate file space for unused portions of the user data memory area, resulting in a size of the reduced user data memory area being smaller than a size of the user data memory area of the master device, the programmable devices configured with the master data file, and the master data file written on the programmable devices.

12. The system as claimed in claim 11 further comprising a local storage unit for compressing the master data file including compressing the reduced user data memory area and for decompressing the master data file including decompressing the reduced user data memory area.

13. The system as claimed in claim 11 wherein the configuration information is an extended chip-specific data register information of an embedded multimedia card (eMMC) flash memory device.

14. The system as claimed in claim 11 wherein the source socket receives the programmable devices.

15. The system as claimed in claim 11 wherein partition table of the master data file includes boot information of a boot partition.

16. The system as claimed in claim 11 wherein:
the destination sockets are configured to receive the programmable devices; and
wherein:
the partition table of the master device is calculated from the configuration information; and
the programmable devices in one of the destination sockets is for configuring with the master data file.

17. The system as claimed in claim 16 wherein the partition table includes a boot partition, the general purpose area partition, and the user data memory area for an embedded multimedia card (eMMC) flash memory device.

18. The system as claimed in claim 16 wherein the partition table includes the extended chip-specific data register information of an embedded multimedia card (eMMC) flash memory device.

19. The system as claimed in claim 16 wherein the master data file includes a boot partition, the general purpose area partition, and the user data memory area from the master data file.

20. The system as claimed in claim 16 wherein one of the programmable devices is removed from the source socket with the device placement unit.

* * * * *